June 11, 1968  P. DAVIS  3,387,765

VENT OPENING

Filed March 23, 1967

INVENTOR
PAUL DAVIS
BY
Wolf, *Greenfield* & *Sacks*

United States Patent Office 3,387,765
Patented June 11, 1968

3,387,765
VENT OPENING
Paul Davis, Swampscott, Mass., assignor to Sweetheart Plastics, Wilmington, Mass., a corporation of Massachusetts
Filed Mar. 23, 1967, Ser. No. 625,455
4 Claims. (Cl. 229—43)

ABSTRACT OF THE DISCLOSURE

A self-sealing vent in a disposable plastic cover, which is defined by at least two intersecting cuts that define a tab displaced from the wall of the cover in which it is formed.

---

This invention relates to disposable plastic lids and more particularly comprises a thin-walled disposable plastic container cover having a vent opening which is self sealing when the container contents exerts a force against the underside of the cover.

Disposable vending cups are now used throughout the world to carry away beverages purchased from machines, snack bars and wherever else beverages are sold to be taken from the premises. Obviously covers must be provided for such containers to allow the purchaser to carry the beverage away without spilling the contents. Hot coffee, perhaps the most common beverage sold in take-out cups, requires that certain features be provided in the cup cover for the cover to be used successfully. The hot coffee gives off steam which must be vented from the cup through the cover to prevent the build up of pressure in the cup, which may otherwise pop the cover from the cup rim. While the cover therefore must provide a vent opening, the opening preferably should not allow any appreciable spillage of the coffee from the cup. Moreover, the vent opening should not function as a nozzle to spray the coffee against the hand of the party who mounts the cover in place on the cup rim.

While some satisfactory arrangements have been provided in container covers to provide the necessary venting, those that have functioned most satisfactorily have been relatively expensive.

One important object of this invention is to provide a disposable thin-walled plastic cover which has a vent opening that is self sealing when liquid splashes against it from within the container.

Another important object of this invention is to provide a thin-walled plastic disposable container cover which does not create a spout or otherwise function as a nozzle and cause the coffee to squirt against the hand of the party mounting the cover on the rim of the container.

Another important object of this invention is to provide a disposable thin-walled plastic container cover which may be vacuum formed and be provided with a self sealing vent opening at negligible cost.

To accomplish these and other objects, the thin-walled plastic disposable container cover of this invention includes among its features a diaphragm like planar closure wall with at least two intersecting cuts through the wall which define a generally pie-shaped tab having adjacent side edges formed by the cuts. The tab is displaced angularly with respect to the plane of the closure wall to separate the adjacent side edges from the closure wall plane to form a vent opening in the wall. The tab is displaceable by the force of the liquid within the container closed by the cover so as to move into the plane of the closure wall when the contents exerts a force against the tab.

These and other objects and features of this invention, along with its incident advantages, will be better understood and appreciated from the following detailed description of one embodiment thereof, selected for purposes of illustration and shown in the accompanying drawing, in which.

Figure 1:
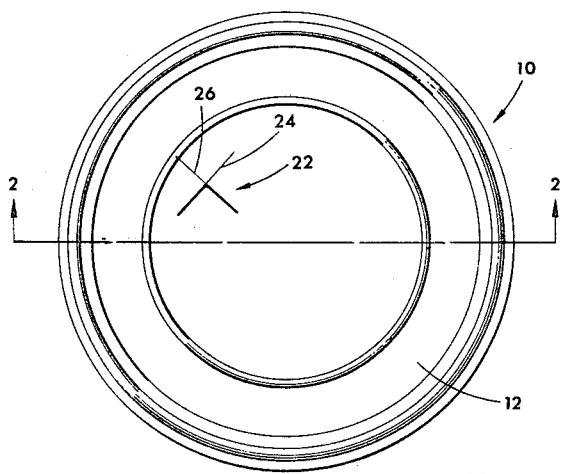
FIG. 1 is a plan view of a thin-walled plastic disposable cover constructed in accordance with this invention.
Figure 2:
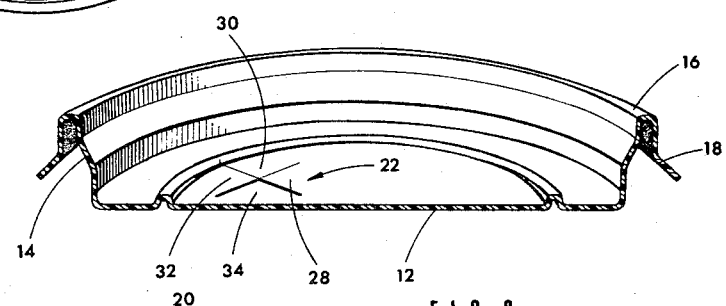
FIG. 2 is a cross sectional view taken along the section line 2—2 of FIG. 1.

The cover 10 shown in the drawing includes a diaphragm-like closure wall 12, an upwardly extending inside wall 14, a horizontal top flange 16 and a skirt 18. As is evident in FIG. 3, the cover 10 is designed to provide an inside fit with the rim of container 20 wherein the closure wall 12 is disposed within the container 20 below the container rim when the cup is in its upright position. The particular configuration of the wall 14, flange 16 and skirt 18, and the manner in which they cooperate with the rim of the container to form a seal at the rim forms no part of this invention and will not be further described. Rather, the present invention relates to the self sealing vent 22 provided in the closure wall 12.

Figure 4:
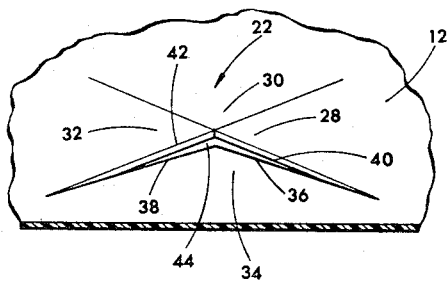
FIG. 4 is an enlarged fragmentary view of a portion of the cover.

The cover 10 typically is formed of a medium impact styrene, and the diaphragm-like closure wall 12 has a thickness in the range of .0095 to .012 inch. In the embodiment shown a pair of intersecting slits 24 and 26, which cross one another to form an X-shaped cut in the wall 12, define the self sealing vent 22. The cuts 24 and 26 may be formed in the closure wall 12 during the trimming operation when the individual lids are cut from the sheet in which they are formed. The cuts extend all the way through the wall 12 so as to effectively form four tabs 28, 30, 32 and 34, each of which is generally pie-shaped and secured to the main portion of the wall 12 at its rear portion. As the blades which form the cuts 24 and 26 pass through the wall 12 at least one of the tabs is displaced from the plane of the closure wall 12 as shown in FIG. 4. In that figure the tab 34 is shown to be somewhat depressed out of the plane of the wall 12 and the other tabs 28, 30 and 32. Thus, the side edges 36 and 38 of the tab 34 are displaced below the side edges 40 and 42 of the tabs 28 and 32, respectively. This displacement forms an opening 44 or vent to allow steam generated in the cup from the hot contents to escape.

It is apparent that so long as the tab 34 remains in the position shown in FIG. 4, the vent opening 44 may function. However, when the tab 34 is moved into the plane of the other tabs and the closure wall 12, the edges 36 and 38 of the tab 34 abut against the edges 40 and 42 of the adjacent tabs, and the tight fit of these edges against one another recloses the opening 44 so as to seal it.

Figure 3:
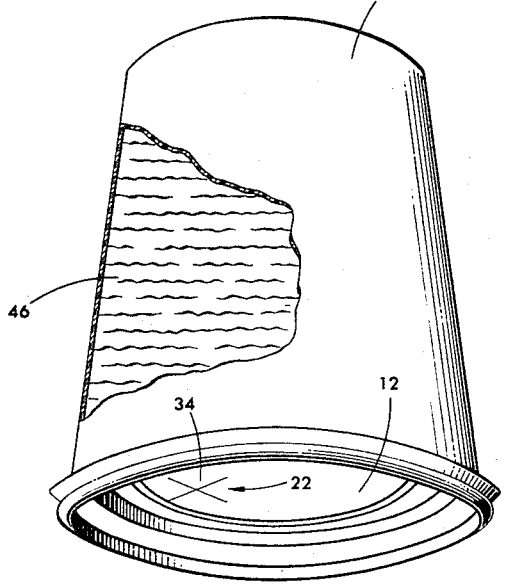
FIG. 3 is a perspective view of a container filled with liquid and closed by the cover of this invention, shown in its inverted form with the liquid bearing against the inside wall of the cover.

In FIG. 3 the tab 34 is shown to lie in the plane of the other tabs and the closure wall 12. Displacement of the tab 34 into the plane occurs under the influence of the liquid 46 in the container 20 bearing down on the tab 34 and effectively pivoting it about its rear portion wherein it is integrally connected to the closure wall. This displacement of the tab reseals the vent opening and prevents the contents 46 from leaking.

A vent opening formed in accordance with this invention as several advantages. First, it is apparent that it may be formed most inexpensively without incurring any additional expense in the fabrication of the cover. The cuts 24 and 26 may be formed during the trimming operation, and therefore, no additional step is required to form it in the closure wall. Further, the shape of the vent opening 44 which lies effectively in a vertical plane, as the edges 40 and 42 lie virtually above and in the plane of the edges 36 and 38, causes any coffee which splashes through the opening 44 to move out in a plane parallel to the plane of the closure wall 12. Therefore, when a cup is overfilled and the lid is pressed down on the rim, the coffee which may escape through the opening 44 is not squirted upwardly from the plane of the wall 12 and perhaps against the hand of the person closing the cup, but rather the coffee may be discharged horizontally onto the top of the wall 12.

In the foregoing description and in the drawing the vent opening 22 is shown to comprise four tabs, one of which is displaced from the plane of the others and the main wall in which they are formed. It is evident that any number of tabs could be formed by two or more intersecting cuts. And one or more tabs may be displaced from the plane of the others. For example, the portion of the cuts 24 and 26 which define the tab 30 could be eliminated as as to form a single tab 34 displaced from the plane of the wall 12. So long as the tab is displaced from the plane of the wall the opening 44 is formed, and because of the nature of the material from which the cup is formed and the interference fit between the side edges of the tab, a seal is formed when pressure is exerted against the tab in an upwardly direction by the contents of the container. The cuts 24 and 26 do not remove any material from the wall 10 to prevent sealing of the tab edges and expansion of the material when heated by the coffee causes interference of the tab edges when they are pushed to a coplanar position.

Because numerous modifications can be made of this invention without departing from its spirit, it is not intended to limit the breadth of this invention to the single embodiment illustrated and described. Rather, it is intended that the scope of this invention be determined by the appended claims and their equivalents.

What is claimed is:

1. A thin-walled plastic disposable cover for beverage containers having a self sealing vent comprising,
    a diaphragm-like planar closure wall,
    at least two intersecting cuts through the wall defining at least one tab having adjacent side edges formed by the cuts,
    said tab being displaced angularly with respect to the plane of the closure wall to separate the adjacent side edges of the tab from the plane of the wall and form a vent opening in the wall,
    said tab being displaceable by a force applied against the bottom surface of the wall by the beverage to move edges in contacting relationship with the edges in the wall plane to seal the opening.
2. A thin-walled plastic disposable cover as defined in claim 1 further characterized by
    said tab being hingedly secured to the wall along the rear portion thereof and free of connections with the wall along the side edges.
3. A thin-walled plastic disposable cover as defined in claim 2 further characterized by
    said cuts being straight and crossing one another to form four pie-shaped tabs.
4. A thin-walled plastic disposable cover as defined in claim 2 further characterized by
    said cuts being straight to form a pie-shaped tab, the apex of the pie-shaped tab being disposed below the plane of the closure wall when the cover is in an upright position.

References Cited

UNITED STATES PATENTS

| | | | |
|---|---|---|---|
| 1,428,399 | 9/1922 | Schilling. | |
| 1,865,764 | 7/1932 | Keenan | 218—56 |
| 2,114,823 | 4/1938 | Toscano | 229—43 |
| 2,335,832 | 11/1943 | Williams | 137—525.1 XR |
| 2,436,291 | 2/1948 | Daniel | 215—56 XR |
| 2,446,571 | 8/1948 | Browne | 137—525.1 |
| 2,899,981 | 8/1959 | Binks | 137—525.1 XR |
| 3,159,175 | 12/1964 | MacMillan | 137—525.1 XR |
| 3,206,059 | 9/1965 | Fead et al. | 220—44 |

FOREIGN PATENTS 621,427  4/1949  Great Britain.

DAVIS T. MOORHEAD, *Primary Examiner.*